Figure 1:
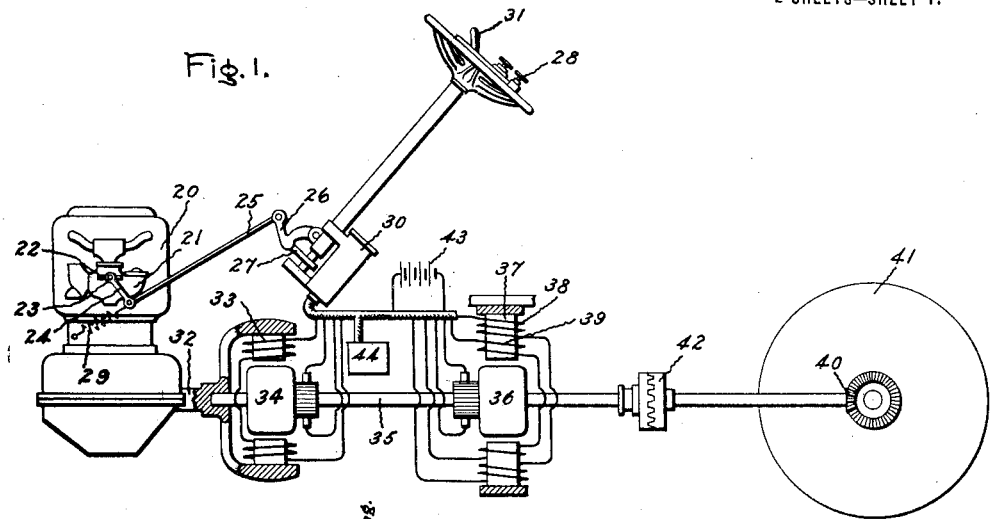

J. F. TRITLE.
CONTROL SYSTEM.
APPLICATION FILED JULY 29, 1918.

1,357,746.

Patented Nov. 2, 1920.
2 SHEETS—SHEET 1.

Inventor:
John F. Tritle,
by
His Attorney.

J. F. TRITLE.
CONTROL SYSTEM.
APPLICATION FILED JULY 29, 1918.

1,357,746.

Patented Nov. 2, 1920.

2 SHEETS—SHEET 2.

Inventor:
John F. Tritle,
by Albert G. Davis
His Attorney.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

CONTROL SYSTEM.

1,357,746.  Specification of Letters Patent.  Patented Nov. 2, 1920.

Application filed July 29, 1918. Serial No. 247,092.

*To all whom it may concern:*

Be it known that I, JOHN F. TRITLE, a citizen of the United States, residing at Schenectady, county of Schenectady, State of New York, have invented certain new and useful Improvements in Control Systems, of which the following is a specification.

The present invention relates to control systems such as are used to control circuits of electric power generating units, and particularly to a control system for use with a power generating unit of the type in which an internal combustion engine drives one member of a series wound electric generator, the other member being normally mechanically connected to a power absorbing means and having connected to it the rotor of an electric motor, the stationary member of which is carried by a suitable support, the current generated by the first machine being supplied to the second for the purpose of increasing the torque delivered to the load or power absorbing means under certain conditions.

One well recognized application of such a system is in connection with automobiles for the transmission of power from an internal combustion engine to the road wheels, and in the following specification the invention is specifically described as applied to this use, although it will be understood that it is not necessarily limited thereto.

When applying such a system to an automobile transmission the field of the series generator is connected to the crank shaft of the internal combustion engine of the automobile and the armature of the generator is connected to the transmission or propeller shaft. On this latter shaft is also the armature of the electric motor, the field of which is supported on the chassis. A controller is provided for varying the electrical connections between the generator and the motor, the handle for the controller being located within reach of the driver.

For the greatest torque or pulling power and low vehicle speeds, the electrical connections are such that the field of the generator is relatively weak and there is the greatest difference between engine speed and the transmission shaft speed. The magnetic clutching effect between the generator field and armature is light and at the same time a relatively large current is being supplied from the generator to the motor.

For the least torque or pulling power and the greatest vehicle speed, the electrical connections are such that the generator is short circuited. The magnetic clutching effect between the generating field and the armature is then the greatest and the difference in speed between the engine and the transmission shaft is least. No current is now supplied to the motor and it no longer assists in driving the load. Under these conditions it is customary to use it as a generator to charge the storage battery. Intermediate between these two positions of greatest torque and least speed and least torque and greatest speed, a number of circuit connections are utilized to get various relations of torque and speed and various relations of engine speed to vehicle speed.

The object of my invention is to provide an improved control system for a power generating unit of this type, and for a consideration of what I believe to be novel and my invention, attention is directed to the accompanying description and the claims appended thereto.

Figure 2:
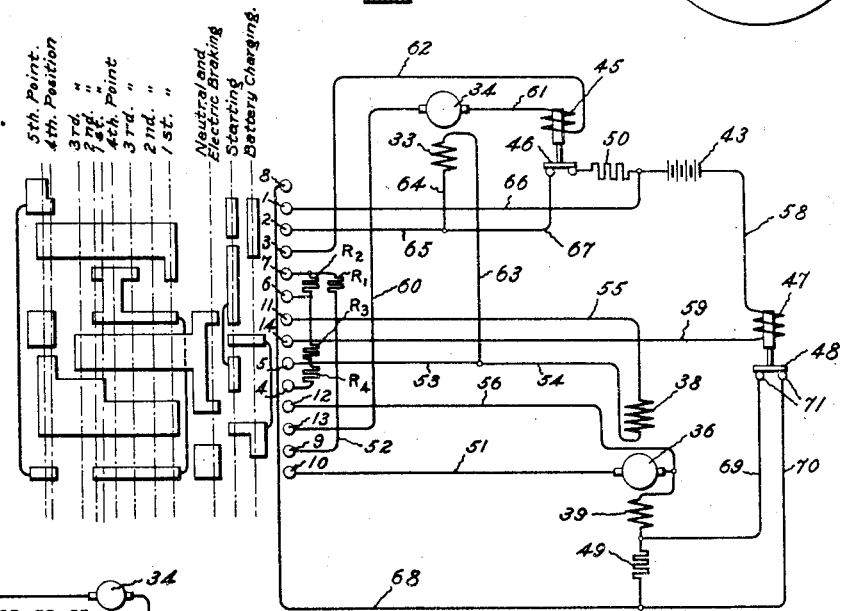
Figure 3:
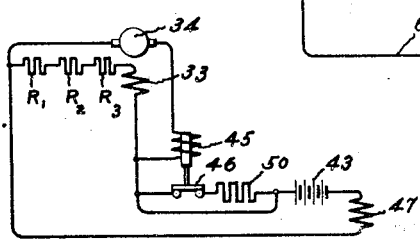

In the drawing, Figure 1 illustrates diagrammatically an automobile vehicle equipped with my improved control system; Fig. 2 is a diagram of the circuit connections showing a development of a controller for connecting them, and Figs. 3 to 14 inclusive are circuit diagrams illustrating in a simplified manner the connections for each controller position.

Referring to the drawing, 20 indicates a multi-cylinder internal combustion engine of any suitable type which is capable of a wide range of running speed. On the side of the engine is a carbureter 21 containing the usual throttle valve 22, mounted on a spindle 23. 24 is an arm on spindle 23 which is connected by a rod 25 to the lever 26. The lever 26 is actuated to change the position of the throttle valve 22 by a cam 27 of variable radius which is rotated by hand lever 28 on the steering column. A spring 29 holds the lever 26 against cam 27 and it will be readily understood that when cam 27 is turned the throttle valve 22 will be opened and closed by the desired amounts. 30 indicates an electrical controller mounted at the base of the steering column and adapted to be turned by hand lever 31. On the main shaft 32 of the engine is mounted the field magnet 33 of a series wound direct current generator, the armature 34 of which is mounted on the transmission shaft 35 of the vehicle. Mounted on the transmission shaft 35 is also the armature 36 of a series wound motor, the field 37 of which is stationary and is suitably supported on the chassis of the vehicle. The field 37 comprises two windings—a series winding 38 and a shunt winding 39. The transmission or propeller shaft 35 carries the usual pinion 40 which forms a part of the differential gearing through which the road wheels 41 are driven. The shaft 35 is preferably made in two sections united by a releasable jaw clutch as shown at 42. 43 indicates a storage battery and 44 a relay casing.

Referring now to Fig. 2, the contact fingers of the controller are numbered from 1 to 14 inclusive and associated with them are resistances $R_1$, $R_2$, $R_3$ and $R_4$. The points of the controller are indicated by dot and dash lines. The third position from the right is the neutral and electric braking point. To the right of this point are the starting point and the battery charging point, and to the left of it are the first running point, second running point, third running point, fourth running point and fifth running point. Between the fourth running point and the fifth running point are four transition positions which are indicated as first transition position, second transition position, third transition position and fourth transition position. In the relay casing 44 is a separate excitation relay having a winding 45 and bridging contact member 46, and a battery charging relay having winding 47 and bridging contact plate 48. 49 indicates a battery charging resistance and 50 a separate excitation resistance.

When the controller is on the neutral or electric braking point, contact fingers 9 and 10 are connected to each other as are also contact fingers 11 and 12. In this position the motor is short circuited through resistances $R_1$, $R_2$, and $R_3$. The circuit may be traced as follows: left-hand brush of motor armature 36, conductor 51, contact finger 10, contact finger 9, conductors 52, resistances $R_1$, $R_2$ and $R_3$, conductors 53 and 54, series field 38, conductor 55, contact finger 11, contact finger 12 and conductor 56 to the right-hand brush of armature 36. The circuit of the series generator is open. The circuit connections for the motor are indicated in a diagrammatic manner in Fig. 5. Since in this position of the controller the motor is short circuited through a resistance it will be seen that as the car is running, the motor will act as an electric brake in a well understood manner. The amount of the braking action depends on the value of the resistances $R_1$, $R_2$ and $R_3$ and if desired a suitable switch may be provided to short circuit one or more of these resistances so as to increase the braking action. Circuit connections and a switch for this purpose are indicated in dotted lines in Fig. 5, a switch 57 being shown connected across the terminals of resistance $R_1$, so that when it is closed such resistance will be cut out of the braking circuit. The switch 57 may, for example, be a suitable foot switch, and it may be arranged to cut out only one section of resistance or more than one as found desirable.

Figure 4:
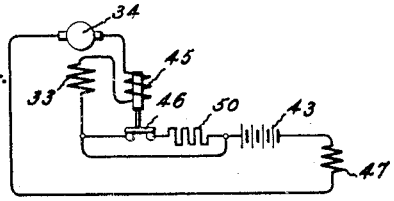

Assume that the engine is stopped and that the controller is on the neutral point. If now it is desired to start the engine, the controller is moved to the starting point. This connects contact fingers 1 and 2 together, contact fingers 3 and 5 together, and contact fingers 13 and 14 together and a circuit is closed from the battery to the generator as follows: right-hand terminal of battery 43, conductor 58, winding 47, conductor 59, contact finger 14, contact finger 13, conductor 60, left-hand brush of generator armature 34, right-hand brush of armature 34, conductor 61, winding 45, conductor 62, contact finger 3, contact finger 5, conductor 53, conductor 63, series field 33, conductors 64 and 65, contact finger 2, contact finger 1 and conductor 66, to left-hand terminal of battery 43. A simplified diagram of these circuit connections is shown in Fig. 4. The generator will now be operated as a motor to start the engine. As soon as the engine is started, the controller may be thrown to the neutral position, and the engine permitted to idle.

When it is desired to start the vehicle into motion, the controller is thrown to the first point. This connects contact fingers 2, 3 and 7 together, contact fingers 12 and 13 together, contact fingers 5 and 14 together, and contact fingers 10 and 11 together. The generator and motor are now connected in series with each other as follows: left-hand brush of generator armature 34, conductor 60, contact finger 13, contact finger 12, conductor 56, right-hand brush of motor armature 36, left-hand brush of motor armature 36, conductor 51, contact finger 10, contact finger 11, conductor 55, series field 38, conductors 54 and 63, series field 33, conductors 64 and 65, contact finger 2, contact finger 3, conductor 62, winding 45, and conductor 61 to right-hand brush of generator armature 34. At the same time the series field 33 of the generator is shunted by resistances $R_2$ and $R_3$ as follows: from the lower side of series field 33, conductors 64 and 65, contact finger 2, contact finger 7, resistance $R_2$, $R_3$ and conductors 53 and 63 to the upper side of series field 33. By this means the field 33 of the generator is rendered relatively weak and there will be the least magnetic drag and the greatest difference in speed between armature 34 and field 33 of the generator. The generator will thus generate a relatively large current, and as referred to above such current will be supplied to the motor. This is the condition of slowest speed and greatest torque.

Figure 6:
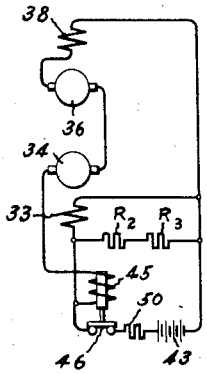
Figure 7:
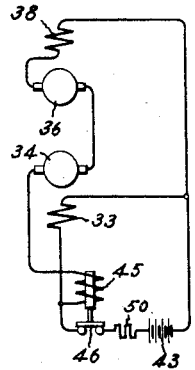
Figure 8:
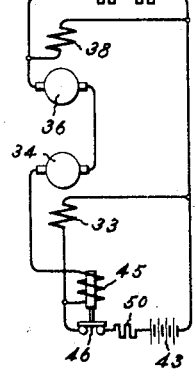
Figure 9:
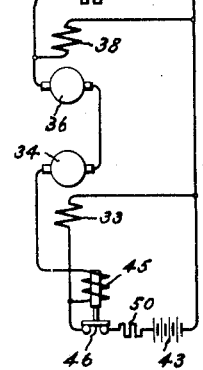
Figure 10:
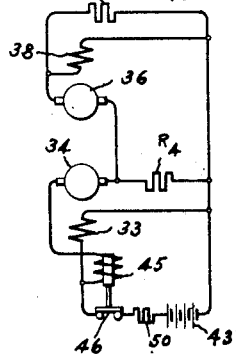
Figure 11:
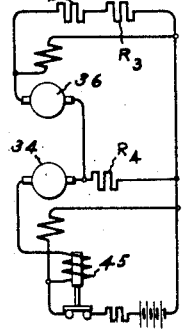
Figure 12:
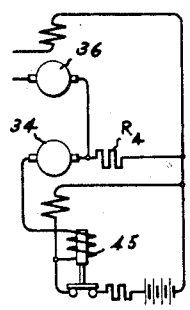
Figure 13:
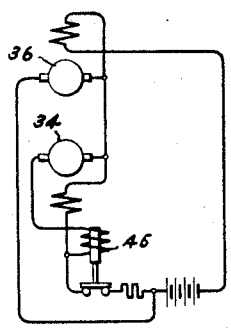
Figure 14:
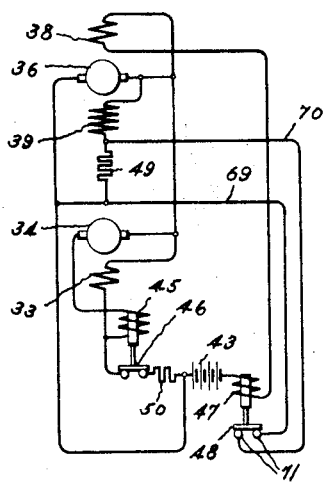

When the vehicle is standing and the controller is in neutral position, no current is being generated by the generator. As a consequence there is no current flowing in the series field 33 and the only field present is that due to permanent magnetism. The field of the generator is therefore weak. Now when the controller is thrown to the first point some little time would be required ordinarily to build up the generator field and in order to expedite the building up of such field a means to provide separate excitation is utilized. To this end when the controller is thrown to the first point, battery 43 is connected across the terminals of the series field 33 as follows: lower side of series field 33, conductors 64 and 67, contact plate 46 of the separate excitation relay, resistance 50, storage battery 43, conductor 58, winding 47 of battery charging relay, conductor 59, contact finger 14, contact finger 5 and conductors 53 and 63 to upper side of series field 33. The battery thus serves to provide a current to energize the series field 33. As soon as a current of predetermined value is being generated by the generator the winding 45 of the separate excitation relay will become sufficiently energized to lift the contact plate 46, thus opening the separate excitation circuit and holding it open, and such circuit will be maintained open as long as the current flowing is above such predetermined value. The storage battery 43 will then no longer supply current to field 33. When the current decreases to a predetermined value, which means that the generator field is becoming relatively weak (and which may occur due to a slowing down of the vehicle), then the separate excitation relay will again close, thus providing additional excitation for the generator. This particular feature of providing separate excitation is useful, therefore, not only when starting the vehicle from rest but also when accelerating the engine and increasing the speed of the vehicle when it has been slowed down by throttling the engine irrespective of the running point at which the controller stands. As will appear, hereinafter, I therefore provide for the separate excitation of the generator field 33 upon all points of the controller. The specific feature of providing separate excitation for a generator field as here shown is particularly described and claimed in the application of Frank E. Case, Serial No. 175,319, filed June 18, 1917. A simplified diagram of the circuit connections for the first point is shown in Fig. 6.

When the controller is moved to the second point contact fingers 2 and 3 are connected together, contact fingers 10 and 11 are connected together, contact fingers 5 and 14 are connected together, and contact fingers 12 and 13 are connected together. The circuit connections are the same as those for the first point except that the shunt around generator field 33 through resistances $R_2$ and $R_3$ is opened at contact finger 7. The connections are shown in simplified form in Fig. 7. Removing the short circuit around generator field 33 results in the generator field being strengthened so that the magnetic drag of such field on armature 34 is increased. This will increase the speed of the vehicle and at the same time will decrease the amount of current generated by the generator and supplied to the motor.

When the controller is thrown to the third point contact fingers 2 and 3 are connected together, contact fingers 7, 10 and 11 are connected together, contact fingers 12 and 13 are connected together, and contact fingers 5 and 14 are connected together. These are the same connections as are found on point two except that the connecting of contact finger 7 to contact fingers 10 and 11 results in placing the resistances $R_2$ and $R_3$ in parallel with the motor field 38 as follows: upper side of series field 38, conductor 55, contact fingers 11, contact fingers 7, resistance $R_2$, resistance $R_3$, and conductors 53 and 54 to lower side of series field 38. This forms a shunt around motor field 38 which results in weakening such field and hence the counter E. M. F. generated thereby. As a result a larger current will be generated by and will flow through the generator, thus further increasing the magnetic drag between the generator field and armature and increasing the speed of the vehicle. The circuit connections for the third point are illustrated in simplified form in Fig. 8.

When the controller is moved to the fourth point, contact fingers 2 and 3 are connected together, contact fingers 12 and 13 are connected together, contact fingers 6, 10 and 11 are connected together, and contact fingers 5 and 14 are connected together. This leaves the circuit connections the same as for the third point, except that contact finger 6 is connected to contact fingers 10 and 11 which results in cutting resistance $R_2$ out of the shunt circuit across the series field 38, leaving it shunted by the resistance $R_3$ only. This circuit is as follows: upper side of series field 38, conductor 55, contact finger 11, contact finger 6, resistance $R_3$, and conductors 53 and 54 to lower side of series field 38. The connections for the fourth point are illustrated in simplified manner in Fig. 9. This reduction in the resistance of the shunt circuit around motor field 38 results in a still further weakening of such field and a corresponding strengthening of the generator field 33, thus increasing the magnetic drag between the generator field and armature which still further increases the speed of the vehicle.

When the controller is moved to the fifth point which gives the highest speed, the generator is short circuited and the motor is connected to the storage battery to charge the same. The circuit connections are shown in simplified form in Fig. 14.

Between the fourth point and the fifth point are four transition positions which are shown in simplified form in Figs. 10, 11, 12 and 13.

In the first transition position contact fingers 2 and 3 are connected together, contact fingers 4, 12 and 13 are connected together, contact fingers 10, 11 and 6 are connected together and contact fingers 5 and 14 are connected together. This varies the connections from that for the fourth point only in that contact finger 4 is connected to contact fingers 12 and 13 which results in short circuiting both the motor and generator through resistance $R_4$. The short circuit for the generator may be traced on Fig. 2 as follows: from the upper side of generator field 33, conductor 63, conductor 53, resistance $R_4$, contact finger 4, contact finger 13, conductor 60, generator armature 34, conductor 61, relay winding 45, conductor 62, contact finger 3, contact finger 2, conductors 65 and 64, to lower side of generator field 33. The short circuit for the motor may be traced on Fig. 2 as follows: from the lower side of series field 38, conductors 54 and 53, resistance $R_4$, contact finger 4, contact finger 12, conductor 56, motor armature 36, conductor 51, contact finger 10, contact finger 11, conductor 55 to the upper side of series field 38.

This short circuit between the generator and the motor serves to cut down the amount of current flowing through the motor and to increase the amount flowing through the generator as will be obvious. Increasing the current flowing through the generator still further increases the magnetic clutching effect between the generator field and armature which results in a still higher speed of the vehicle.

In the second transition position contact fingers 2 and 3 are connected together, contact fingers 4, 12 and 13 are connected together, contact fingers 14 and 5 are connected together and contact fingers 7, 10 and 11 are connected together. This varies the connections from that for the first transition position only in that contact finger 6 is no longer connected to contact fingers 10 and 11, while the contact finger 7 is connected thereto. This places both the resistances $R_2$ and $R_3$ in shunt to the motor field 38. This shunt circuit may be traced on Fig. 2 as follows: from the upper side of series field 38, conductor 55, contact finger 11, contact finger 7, resistance $R_2$, resistance $R_3$, conductors 53 and 54 to the lower side of series field 38. The placing of this additional resistance in shunt with the motor field 38 serves to strengthen the motor field and hence increases the counter electromotive force of the motor armature and decreases the amount of current flowing through it. The purpose of this is to decrease the current in the motor armature to a minimum so that when the controller is moved to the third transition position wherein the motor circuit is open, there will be no destructive arcing at the contact points.

In the third transition position the motor circuit is open, the generator circuit remaining the same as that for the second transition position. In the third transition position contact fingers 2 and 3 are connected together, contact fingers 4, 12 and 13 are connected together, and contact fingers 5 and 14 are connected together. The motor circuit is opened at contact fingers 10 and 11. The circuits for the third transition position are very clearly illustrated in Fig. 12. In the third transition position it will be seen that the motor circuit is open and the generator is short circuited through the resistance $R_4$. This will further increase the current of the generator and the magnetic drag between the generator field and armature, and thus increase the speed of the vehicle. The generator will be supplying no current to the motor and the entire driving effect will be due to the magnetic clutching of the generator parts.

In the fourth transition position contact fingers 2 and 3 are connected together, contact fingers 5, 12 and 13 are connected together, contact fingers 1 and 10 are connected together and contact fingers 11 and 14 are connected together. In this transition position the generator is directly short circuited, the resistance $R_4$ being removed from the generator circuit, and the motor is connected to the storage battery 43. The generator circuit may be traced on Fig. 2 as follows: left-hand brush of generator armature 34, conductor 60, contact finger 13, contact finger 5, conductor 53, conductor 63, generator field 33, conductor 64, conductor 65, contact finger 2, contact finger 3, conductor 62, separate excitation relay winding 45, and conductor 61 to right-hand brush of generator field 34. The generator is thus directly short circuited upon itself, giving the greatest magnetic drag between its field and armature and hence the highest vehicle speed.

The separate excitation circuit may now be traced as follows: right-hand terminal of battery 43, conductor 58, battery charging relay winding 47, conductor 59, contact finger 14, contact finger 11, conductor 55 series field 38, conductors 54 and 63, generator field 33, conductors 64 and 67, contact plate 46, resistance 50, to left-hand terminal of battery 43.

The circuit of the motor may be traced as follows: Right-hand brush of motor armature 36, conductor 56, contact finger 12, contact finger 5, conductor 53, conductor 54, series field 38, conductor 55, contact finger 11, contact finger 14, conductor 59, battery charging relay winding 47, conductor 58, storage battery 43, conductor 66, contact finger 1, contact finger 10, and conductor 51 to the left-hand brush of motor armature 36.

In passing from the fourth transition position to the fifth point the motor connections are changed so as to utilize the motor as a generator for charging the storage battery. For this purpose the shunt field 39 of the motor is used in conjunction with the series field 38, the two being connected in opposition to each other.

On the fifth point contact fingers 2 and 3 are connected together, contact fingers 5, 12 and 13 are connected together, contact fingers 1, 8 and 10 are connected together and contact fingers 11 and 14 are connected together. This leaves the generator circuit the same as in the fourth transition position. The motor is connected to the storage battery 43 as follows: Left-hand brush of motor armature 36, conductor 51, contact finger 10, contact finger 1, conductor 66, storage battery 43, conductor 58, battery charging relay winding 47, conductor 59, contact finger 14, contact finger 11, conductor 55, series field 38, conductor 54, conductor 53, contact finger 5, contact finger 12, conductor 56 to the right-hand brush of motor armature 36. This circuit, it will be seen, particularly by referring to Fig. 14, includes the series field of the motor, the winding 47 of the battery charging relay and the storage battery 43. The shunt field 39 is connected across the motor armature through battery charging resistance 49 by a circuit which may be traced on Fig. 2 as follows: Right-hand brush of motor 36, shunt field 39, resistance 49, conductor 68, contact finger 8, contact finger 10, conductor 51 to the left-hand brush of motor armature 36. Connected across the terminals of the battery charging resistance are conductors 69 and 70 which lead to the contacts 71 of the battery charging relay, the contacts 71 being bridged by the contact plate 48. When the contact plate bridges contact 71 the resistance 49 is short circuited so that the shunt field is connected directly across the terminals of the motor. This will be clearly understood from an inspection of Fig. 14. As will be clear this arrangement turns the motor into a compound wound generator of the so-termed "constant potential type," the field comprising both a shunt winding and a series winding which oppose each other, the shunt field predominating. As is well understood, with such a compound wound generator, as the speed increases, thus increasing the charging current, the field is weakened due to the increase of current in the series field winding. Such a generator does not maintain the voltage constant but will maintain it within permissible limits over quite a wide range of speed. However, in connection with automobiles it is desirable to have the storage battery charge over extremely wide ranges and it has not been found practicable to compound a generator so that it will maintain the voltage within permissible limits under these conditions. The battery charging resistance 49 is accordingly utilized and is cut into the circuit when the charging current reaches a predetermined value so as to weaken the field thus reducing the charging current.

It will be seen that the charging current for the battery 43 passes through the winding 47 of the battery charging relay and that the resistance 49 is normally short circuited by contact plate 48. When the charging current reaches a predetermined value, winding 47 will lift contact plate 48 thus opening the circuit through conductors 69 and 70 and placing the battery charging resistance 49 in series with the shunt field 39.

A battery charging arrangement of this character is particularly described and claimed in the application of William B. Potter, Serial No. 197,721, filed October 20, 1917.

Referring particularly to Figs. 10, 11, 12, and 13 it will be seen that in going from the fourth point where the generator and motor are in series to the fifth point where the generator is short circuited and the motor is connected to charge the battery, the current through the generator is gradually increased and that through the motor is gradually decreased. This prevents any sudden jerk being given to the transmission and prevents arcing when the motor circuit is opened. In the third transition position the generator is short circuited through resistance $R_4$ and the motor circuit is open, and this position may be used with advantage as a running point in case it is desired to operate the vehicle without charging the battery. This may be desirable, for example, when the battery is fully charged.

The purpose in providing auxiliary excitation for the generator field has already been referred to and it is to be noted that such auxiliary excitation is provided for on all the running points of the controller and on each of the transition positions between the fourth and fifth controller points. Separate excitation for the generator is thus always available.

Figure 5:
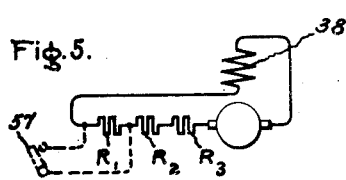

When the vehicle is running and the controller is thrown to the neutral and electric braking point, the motor is short circuited as shown in Fig. 5 and a braking current of considerable magnitude may be flowing. Now when the controller is again moved to a running point, this motor circuit must be broken and to avoid arcing the arrangement is such that in moving the controller from the neutral and electric braking point toward the first point, the motor field is short circuited, thus killing the motor field, prior to the braking circuit being opened. To this end the arrangement is such that as the controller begins to move from this neutral and electric braking point toward the first point, contact fingers 11 and 5 are temporarily connected together which directly short circuits motor field 38.

It may sometimes be desirable to charge the battery when the vehicle is standing and for this purpose the battery charging point is provided at which the generator is connected to the storage battery. When the controller is placed on the battery charging point contact fingers 1, 2 and 3 are connected together, and contact fingers 9, 13 and 14 are connected together. This converts the generator into a shunt machine, the connections being shown in simplified form in Fig. 3. The connections of the field 33 to the armature 34 may be traced on Fig. 2 as follows: left-hand brush of generator, conductor 60, contact finger 13, contact finger 9, resistance $R_1$, $R_2$ and $R_3$, conductors 53 and 63, field 33, conductors 64 and 65, contact finger 2, contact finger 3, conductor 62, relay winding 45, conductor 61 to right-hand brush of generator. The connections of the battery 43 to the generator may be traced on Fig. 2 as follows: right-hand terminal of battery 43, conductor 58, relay winding 47, conductor 59, contact finger 14, contact finger 13, conductor 60, generator armature 34, conductor 61, relay winding 45, conductor 62, contact finger 3, contact finger 1, and conductor 66 to left-hand terminal of battery 43. With the engine running at suitable speed, the battery may be charged as desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a system of the character described for transmitting power from a prime mover to a load comprising a generator having one element connected to the prime mover and the other connected to the load, a motor having one element connected to the load and the other fixed, and a storage battery, the combination with such system of a controller having a plurality of successive points on one of which the generator and motor are connected in series and on another of which said generator is short circuited and the motor is connected to the storage battery, and contacts and connections comprising means whereby as the controller is moved from the one point to the other, the field of the generator is strengthened and that of the motor weakened by placing a short circuit containing a resistance across their terminals, then the field of both the generator and motor are strengthened after which the motor circuit is opened and then connected to the storage battery.

2. In a system of the character described for transmitting power from a prime mover to a load comprising a generator having one element connected to the prime mover and the other connected to the load, a motor having one element connected to the load and the other fixed, and a storage battery, the combination with such system of a controller having a plurality of successive points on one of which the generator and motor are connected in series and on another of which said generator is short circuited and the motor is connected to the storage battery, and contacts and connections comprising means whereby as the controller is moved from the one point to the other, the field of the generator is strengthened and that of the motor weakened by placing a short circuit containing a resistance across their terminals, then the field of both the generator and motor are strengthened after which the motor circuit is opened and then connected to the storage battery and the resistance in the short circuit for the generator is removed.

3. In a system of the character described for transmitting power from a prime mover to a load comprising a generator having one element connected to the prime mover and the other connected to the load, a motor having one element connected to the load and the other fixed, the combination with such system of a controller having two successive points on one of which the generator and motor are connected in series and on the other of which the generator is short circuited, and transition positions between said two points comprising means whereby the generator and motor are first short circuited through a resistance, after which the motor field is strengthened, and the motor circuit then opened and the generator directly short circuited.

4. In a system of the character described for transmitting power from a prime mover to a load comprising a generator having one element connected to the prime mover and the other connected to the load, a motor having one element connected to the load and the other fixed, the combination with such system of a controller having two successive points on one of which the generator and motor are connected in series and on the other of which the generator is short circuited, and transition positions between said two points, comprising means for short circuiting the generator and motor through a resistance, means for strengthening the motor field, and means for opening the motor circuit and reducing the resistance in the generator short circuit.

5. In a system of the character described for transmitting power from a prime mover to a load comprising a generator having one element connected to the prime mover and the other connected to the load, a motor having one element connected to the load and the other fixed, the combination with such system of a controller having two successive points on one of which the generator and motor are connected in series with a resistance in shunt to the motor field, and on the other of which the generator is short circuited, and transition positions between said two points comprising means for short circuiting the generator and motor, means for increasing the amount of resistance in the motor field shunt, and means for opening the motor circuit.

In witness whereof I have hereunto set my hand this 26th day of July, 1918.

JOHN F. TRITLE.